US007751064B2

(12) United States Patent
Liesener et al.

(10) Patent No.: US 7,751,064 B2
(45) Date of Patent: Jul. 6, 2010

(54) INTERFERENCE OBJECTIVE FOR ANNULAR TEST SURFACES

(75) Inventors: Jan Liesener, Middletown, CT (US); James F. Biegen, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 407 days.

(21) Appl. No.: 12/017,612

(22) Filed: Jan. 22, 2008

(65) Prior Publication Data

US 2009/0185195 A1 Jul. 23, 2009

(51) Int. Cl.
*G01B 11/02* (2006.01)
(52) U.S. Cl. ...................................... 356/512
(58) Field of Classification Search .......... 356/511–514
See application file for complete search history.

(56) References Cited

U.S. PATENT DOCUMENTS

| | | | | |
|---|---|---|---|---|
| 4,340,306 A | 7/1982 | Balasubramanian | ........ | 356/360 |
| 4,387,994 A | 6/1983 | Balasubramanian | ........ | 356/513 |
| 4,725,144 A | 2/1988 | Nelson et al. | ............... | 356/360 |
| 4,743,117 A | 5/1988 | Kitabayashi et al. | ........ | 356/520 |
| 4,872,755 A | 10/1989 | Küchel | ........ | 356/360 |
| 4,898,470 A | 2/1990 | Cleaveland | ................ | 356/513 |
| 4,948,253 A | 8/1990 | Biegen | ........ | 356/351 |
| 5,155,554 A * | 10/1992 | Schnable et al. | ............ | 356/495 |
| 5,283,629 A * | 2/1994 | Dey et al. | .................... | 356/513 |
| 5,293,214 A | 3/1994 | Ledger | ........ | 356/355 |
| 5,398,113 A | 3/1995 | de Groot | ..................... | 356/360 |
| 5,485,275 A | 1/1996 | Ohtsuka | ..................... | 356/513 |
| 5,757,493 A * | 5/1998 | VanKerkhove | .............. | 356/511 |
| 5,784,164 A | 7/1998 | Deck et al. | .................. | 356/359 |
| 5,991,035 A | 11/1999 | Bruning | ..................... | 356/359 |
| 6,154,279 A | 11/2000 | Thayer | ........ | 356/376 |
| 6,195,168 B1 | 2/2001 | De Lega et al. | ............. | 356/497 |
| 7,030,996 B2 | 4/2006 | De Groot et al. | ............ | 356/512 |
| 7,212,291 B2 | 5/2007 | De Lega et al. | ................. | 356/512 |
| 2001/0028462 A1 | 10/2001 | Ichihara et al. | ............. | 356/512 |
| 2003/0011783 A1 | 1/2003 | Suzuki et al. | ............... | 356/512 |
| 2003/0043385 A1 | 3/2003 | Kuchel | ........ | 356/513 |

FOREIGN PATENT DOCUMENTS

WO      WO 01/27558      4/2001

(Continued)

OTHER PUBLICATIONS

Bhushan et al., "Measurement of Surface Topography of Magnetic Tapes by Mirau Interferometry", *Applied Optics*, vol. 24, No. 10, pp. 1489-1497 (May 15, 1985).

(Continued)

*Primary Examiner*—Michael A Lyons
(74) *Attorney, Agent, or Firm*—Fish & Richardson P.C.

(57) ABSTRACT

An apparatus including: an interferometric objective comprising a beam splitter surface configured to separate input light into test light and reference light, and a reference surface configured to receive the reference light and direct it back to the beam splitter surface, which is configured to recombine the reference light with test light reflected from a test surface, the interferometric objective further comprising one or more optical elements positioned in the path of the input light and having positive or negative optical power, wherein the reference surface is curved and defines a window to pass the input light towards the beam splitter surface.

28 Claims, 12 Drawing Sheets

FOREIGN PATENT DOCUMENTS

WO     WO 01/75395     10/2001
WO     WO 02/14845      2/2002

OTHER PUBLICATIONS

Blümel et al., "Absolute interferometric calibration of toric and conical surfaces", *SPIE*, vol. 3134, pp. 370-378 (Jul. 1997).

Boppart et al., "Forward-imaging instruments for optical coherence tomography", *Optics Letters*, vol. 22, No. 21, pp. 1618-1620 (Nov. 1, 1997).

Brinkman et al., "Testing of rod objects by grazing-inidence interferometry: experiment", *Applied Optics*, vol. 38, No. 1, pp. 121-125 (Jan. 1, 1999).

Chakmakjian et al., "Simultaneous focus and coherence scanning in interference microscopy", *Technical Digest, International Workshop on Interferometry*, 171 (Riken, Japan, 1996).

Dresel et al., "Three-dimensional sensing of rough surfaces by coherence radar", *Applied Optics*, vol. 31, No. 7, pp. 919-925 (Mar. 1, 1992).

Li et al., "Imaging needle for optical coherence tomography", *Optics Letters*, vol. 25, No. 20, pp. 1520-1522 (Oct. 15, 2000).

Lindner et al., "White-light interferometry via an endoscope", *SPIE*, vol. 4777, pp. 90-101 (Jul. 2002).

Matthys et al., "Panoramic Holointerferometry", *Experimental Mechanics*, vol. 35, No. 1, pp. 83-88 (Mar. 1995).

Schwider, "White-light Fizeau interferometer", *Applied Optics*, vol. 36, No. 7, pp. 1433-1437 (Mar. 1, 1997).

Zhou et al., "Surface profile measurements using a white light Linnik interferometer", *Annual Report Lehrstuhl für Optik, Univ. Elrlangen-Nürnberg* pp. 69 (1996).

\* cited by examiner

INTERFERENCE OBJECTIVE FOR ANNULAR TEST SURFACES

TECHNICAL FIELD

This disclosure relates to optical metrology, and more particularly to interferometry.

BACKGROUND

Interferometric techniques are commonly used to measure the profile of a surface of an object. To do so, an interferometer combines a measurement wavefront reflected from the surface of interest with a reference wavefront reflected from a reference surface to produce an interferogram. Fringes in the interferogram are indicative of relative height variations between the surface of interest and the reference surface.

A scanning interferometer scans the optical path length difference (OPD) between the reference and measurement legs of the interferometer over a range comparable to, or larger than, the coherence length of the interfering wavefronts, to produce a scanning interferometry signal for each camera pixel used to measure the interferogram. A limited coherence length can be produced, for example, by using a white-light source, which is referred to as scanning white light interferometry (SWLI). A typical scanning white light interferometry (SWLI) signal is a few fringes localized near the zero optical path difference (OPD) position. The signal is typically characterized by a sinusoidal carrier modulation (the "fringes") with Gaussian-shaped fringe-contrast envelope. The conventional idea underlying SWLI metrology is to make use of the localization of the fringes to measure surface profiles.

A common challenge for manufacturers is precise measurement of surface topography. Examples of manufactured items requiring metrology are engine parts, components for magnetic storage devices, flat-panel displays, molded and textured plastic surfaces, mechanical pump surfaces and seals, and minted coins. In these and other Industrial Markets, there is a significant and growing need for fast, accurate metrology of parts having non-flat prismatic surfaces. These parts include three-dimensional (3D) cones, cylinders, and spheres, often having surfaces as small as 2 mm in diameter and 75 mm deep with 3D form tolerances of as low as 0.5 µm. An important example is fuel system valves, which are fundamental building blocks in engines, pumps and other hydraulic systems. Manufacturing the conical form of these parts within tolerance specifications is a high priority. For instance, the roundness of valve seats is important to valve function as it relates closely to leakage—a valve seat not conforming to specified roundness would likely yield a leaky valve. Additionally, many of these surfaces are deeply recessed within narrow cylindrical holes, making precise metrology even more challenging.

Presently, most measurements on fuel system components are mechanical or tactile (e.g., stylus gages). There is a strong interest in this industry to transition to optical techniques, for example by using interferometry, which can improve throughput, data density and uncertainty compared with mechanical techniques. One key advantage of optics is the "3D" aspect of the surface measurement, as opposed to the linear trace of a stylus gage. However, many industrial surfaces such as interior cones are difficult to measure optically, because of their unusual shape and surface texture, when compared to the usual optical testing samples such as mirrors, prisms and lenses.

SUMMARY

Disclosed herein are embodiments of an interference objective especially suitable for interferometry measurements for annular test surfaces, such as valve seats and other test surfaces in recessed bores.

In certain embodiments, the interference objective is a rotationally symmetric interference objective, the tip of which forms an interferometric cavity with a built-in reference surface and a planar beam-splitter surface. The optics in the interferometric cavity are built symmetrically with respect to the planar beamsplitter surface. The reference surface is annular thereby providing either an on-axis hole or window or an off-axis annular window through which the illumination and imaging beams pass. The annular reference surface can be planar, conical, spherical or aspheric.

Specific features can include a configuration wherein the interference objective defines a cavity where optical paths are nominally matched between the reference and test legs, allowing the use of spatially extended and/or broadband light sources for profiling both polished and rough surfaces. Furthermore, the optics can be designed to cause the chief ray of each illumination bundle to be essentially parallel to the local surface normal of the reference surface. Also, the objective can include an annular reference surface formed with or without a reflective coating on one surface of a lens that is part of both the illumination and imaging system. In more specific embodiments, the objective can include an annular reference surface together with an on-axis central obscuration formed with a reflective coating on one surface of a lens that is part of both the illumination and imaging system. Also, in more specific embodiments, the chief ray of any illumination bundle directed towards the local surface normal of the annular reference surface is unobscured.

We now summarize difference aspects and features of the embodiments disclosed herein.

In general, in one aspect, an apparatus is disclosed that includes: an interferometric objective including a beam splitter surface configured to separate input light into test light and reference light, and a reference surface configured to receive the reference light and direct it back to the beam splitter surface, which is configured to recombine the reference light with test light reflected from a test surface. The interferometric objective further includes one or more optical elements positioned in the path of the input light and having positive or negative optical power. The reference surface is curved and defines a window to pass the input light towards the beam splitter surface.

Embodiments of the apparatus can further include any of the following features.

The window can be inside the reference surface. For example, the reference surface can extend around portions of the window, or even completely surround the periphery of the window. One of the optical elements having optical power can be positioned in the window. Also, for example, the one or more elements with optical power can be configured to cause the reference light to converge toward to the reference surface, wherein the reference surface has a concave curvature with respect to incident reference light.

The window can be an outer annulus surrounding at least a portion of the reference surface. For example, the reference surface can further define a second inner window through which a portion of the input light passes to the beam splitter surface. Also, for example, the reference surface can be convex with respect to reflecting the reference light.

The reference surface can define an annular optical measurement surface for an annular test surface wherein the optical measurement surface is a surface in the path of the test light corresponding to a zero optical path length difference between the test light and reference light.

The curvature of the reference surface can be conical, spherical, or aspheric.

The beam-splitting surface, the reference surface, and the one or more optical elements with positive or negative optical power can extend along an optical axis and each can be rotationally symmetric with respect to the optical axis. The reference surface can be annular. For example, the window can include an inner window inside the annular reference surface. Alternatively, for example, the window can include an outer annular window outside the annular reference surface.

The one or more optical elements with optical power can be configured to cause chief rays for the reference light to be substantially normal to the reference surface.

The one or more optical elements with optical power can include multiple lens elements.

The reference surface can be a reflective coating on one of the optical elements with optical power.

The beam-splitter surface can be formed by an interface between two optical element, at least one of which is one of the optical elements having optical power.

The apparatus can be configured so that during operating the reference light passes through at least one of the one or more elements with optical power after being formed by the beam-splitting surface and before contacting the reference surface.

The reference surface can be configured to define an outer annular window and an inner window with a central obscuration to provide on-axis reference light The interference objective can be a unitary component configured to fit into a microscope. The apparatus can further include the microscope. The apparatus can further include a displacement element configured to scan a distance between the interference objective and the test surface, and a detector configured to record an interference patterned formed by the recombined test and reference light for each of multiple scan positions for the distance between the interference objective and the test surface.

In another aspect, an interferometric objective is disclosed that includes a beam splitter surface configured to separate input light into test light and reference light, and a reference surface configured to receive the reference light and direct it back to the beam splitter surface, which is configured to recombine the reference light with test light reflected from a test surface. The interferometric objective further includes one or more optical elements positioned in the path of the input light and having positive or negative optical power. The reference surface defines a window inside the reference surface to pass the input light towards the beam splitter surface.

The inteferometric objective can further include any of the features described above in connection with the first mentioned interferometric objective.

In another aspect, the a method is disclosed which includes using either interference objective described above to perform scanning interferometry measurements of an annular test surface. In certain embodiments, the annular test surface is a conical valve seat. Furthermore, in certain embodiments, the annular test surface is located in a bore of cylindrical test object.

As used herein, "aspheric," "a spherical," and "asphericity" refer to departures from a spherical curvature. A parabolic mirror is an example of an aspheric optical surface, which is generally as an equation of the form:

$$z = \frac{cr^2}{\left(1 + \sqrt{1 - (1+k)c^2 r^2}\right)}, \quad (1)$$

where c is the curvature (inverse of the paraxial radius), r is the radial coordinate, and k is the conic constant (=−1 for a parabola). The same equation describes a sphere when k=0. Other conic sections (hyperbolae, ellipses) are obtained for other values of k. Other aspheric surfaces (with an axis of symmetry) can be described by adding additional polynomial terms, typically in the form:

$$z = \frac{cr^2}{\left(1 + \sqrt{1 - (1+k)c^2 r^2}\right)} + a1r^4 + a2r^6 \ldots . \quad (2)$$

As used herein, "light" refers to electromagnetic radiation in any of the ultraviolet, visible, near-infrared, and infrared regions of the electromagnetic spectrum.

Unless otherwise defined herein (either explicitly or implicitly), all technical and scientific terms used herein have the same meaning as commonly understood by one of ordinary skill in the art to which this invention belongs. All patents, patent applications, and references mentioned herein are incorporated herein by reference; in case of conflict, the definitions in the present document control.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
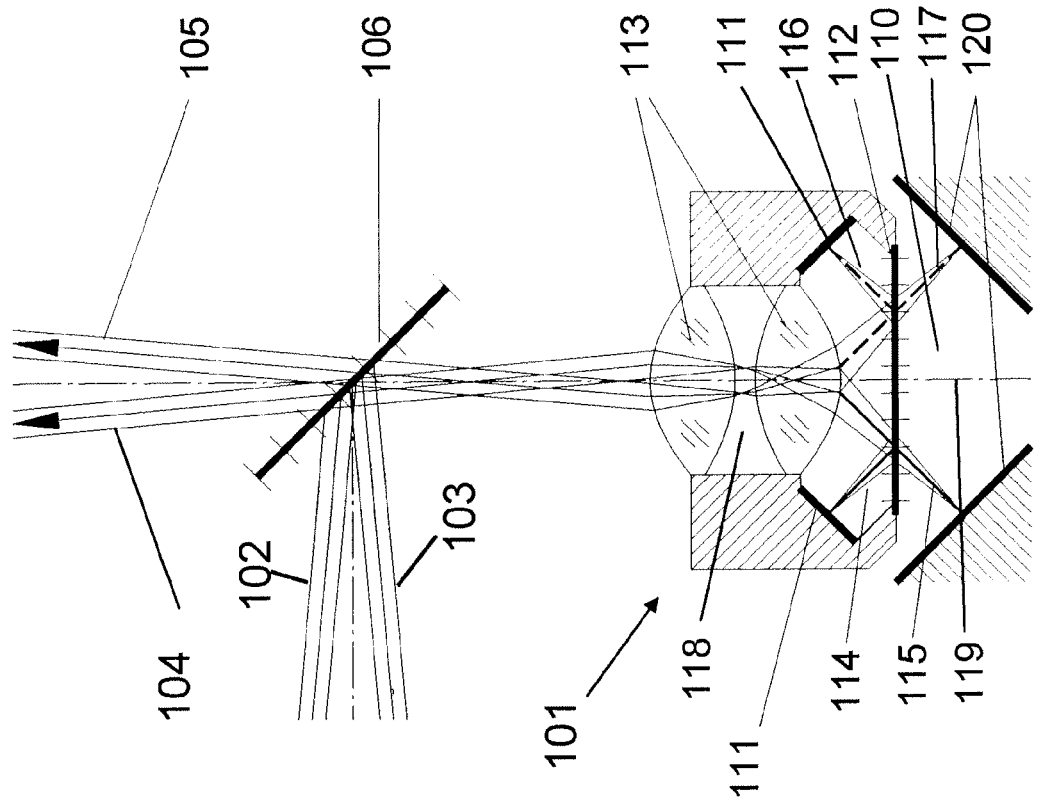
FIG. 1 is a sketch of an exemplary interferometric objective.

Embodiments disclosed herein provide an interferometry apparatus comprising an interferometric objective, including an interferometric cavity with a built-in reference surface and beamsplitter surface. The interferometric objective separates and recombines the light in the interferometric cavity at the beamsplitter surface, and forms a unitary component configured to fit into an interferometer. Furthermore, one or more elements in the objective have optical power, i.e., the ability to change the direction of propagation of light incident upon the element. For example, elements with positive power cause a bundle of rays propagating parallel to the optical axis to converge, and elements with negative power cause the bundle of rays to diverge. Light incident upon the entrance surface of the objective element from outside the objective originates from an illuminator and will be denoted as an "illumination beam" or "input light", while light incident upon the exit surface of the objective element from inside the objective comprises the light recombined at the beamsplitter surface and will be denoted as an "imaging beam".

An objective beamsplitter at the beamsplitter surface separates the illumination beam into light beams directed at the reference surface and a test surface, denoted as "reference beams" and "test beams", respectively. It can be advantageous for the beamsplitter to separate the test and reference beams in a 50/50 ratio with respect to average beam intensity. For rough test surfaces, however, some beam energy is lost due to diffuse scatter, and it may be advantageous for the beamsplitter to send more energy to the test beam.

In certain embodiments, the reference surface, which can have a conical, spherical, or aspheric profile, provides an on-axis hole or window and/or an off-axis window through which the illumination beams and imaging beams pass. The ideal shape of a reference surface depends on manufacturability, the desired field of view (FOV), the shape of the test surface, and calibration procedures. In certain embodiments, the reference surface substantially surrounds the objective beamsplitter and can be substantially rotationally symmetric. The windows in the reference surface comprise a transparent material, air, or vacuum and allow illumination beams and image beams to pass through with no or little loss of intensity. The windows in the reference surface may possess on-axis obscurations smaller than the on-axis beam width in order to improve the fringe contrast in on-axis measurements. The reference surface can possess local surface normals whose angle with respect to the optical axis of the interferometric objective is large, e.g., greater than 10 degrees, greater than 20 degrees, greater than 30 degrees, greater than 40 degrees, greater than 50 degrees.

The interferometric cavity of the interferometric objective is formed in the space between the objective beamsplitter and the test surface or reference surface. In preferred embodiments, the interferometric cavity length is kept as small as possible and the number of optical components within the interferometric cavity is kept as small as possible; this makes manufacturing and dispersion matching between the reference and test legs simpler. In the simplest case, the interferometric cavity contains only the glass necessary to build a planar beamsplitter.

For phase shifting interferometry (PSI), optical path difference (OPD) scans can be achieved either by moving the objective with respect to the test surface or either the reference surface or beamsplitter in the objective or both the reference surface and beamsplitter simultaneously.

A principal sketch of an exemplary interferometric objective is shown in FIG. 1. Illumination beams 102 and 103 are coupled into the interferometric objective 101 by means of an illumination beamsplitter 106 and directed towards the interferometric cavity 110. The interference objective contains the objective beamsplitter 112 that splits the beams 102, 103 into reference beams 114, 116 and test beams 115, 117. The test beams 115, 117 are reflected off a test part 120 and the reference beams 114, 116 are reflected off the reference surface 111 which is built into the interference objective 101 and has, in this example, an on-axis window 118 through which the illumination beams 102, 103 and the imaging beams 104, 105 may pass. The test and reference beams are recombined at the objective beamsplitter 112 and propagate back through the objective element 113 to an imaging device or an eye piece (not shown).

It is advantageous for optical paths of the test beams 115, 117 and the reference beams 114, 116 to be matched; that is, the interference objective 101 is preferably positioned such that, for identical test and reference surfaces, the optical path lengths of the test and reference beams are equal. Such a configuration allows for the use of spatially extended and/or broadband light sources for profiling both polished and rough test surfaces. In certain embodiments, it is advantageous for any optics within the interferometric cavity 110 to be symmetric with respect to the beamsplitter surface, as this would preserve the matched optical path lengths for the test and reference beams. Further, the dispersion, or the change in optical path with wavelength, should also be matched.

It is further advantageous for the objective element 113 within the interference objective 101 to be designed such that chief rays (bolded and dashed lines for beams 114 and 116, respectively) of the reference beams 114, 116 are essentially parallel to a local surface of the reference surface 111 at the location of incidence. Such a configuration allows for the chief rays of the reference beams to be reflected substantially along their incident path and minimizes the optical path lengths to be traveled by the chief rays of the reference beams between the reference surface and the beamsplitter surface. A benefit of this configuration is to facilitate the interferometric measurement of the test surface 120 in the case that the normal of the test surface 120 is strongly inclined with respect to the optical axis 119. Moreover, because the optical path lengths of the chief rays of the reference beams are minimized, the interferometric cavity 110 is kept as small as possible (less environmental influences), the working distances between the objective beamsplitter 112 and the reference surface 111 is small, and the interferometric objective 101 is compactly built for hard-to-reach test areas, such as an end of a bore hole. Still further, because the chief rays of the illumination beams in such a configuration are reflected substantially along their incident path upon reflection off the reference surface 111, the same objective element 113 used to steer illumination beams 102, 103 from the beamsplitter 106 to the reference surface 111 may also be used to direct the subsequent image beams 104, 105 back to the beamsplitter 106 and to an imaging system (not shown). Further, this configuration is the ideal condition for maximum light return through the reference surface window 118 and maximum sensitivity to deformations in the test surface 120.

It is further advantageous for the objective element 113 within the interference objective 101 and the window 118 within the reference surface 111 to be designed so that the chief ray of any illumination beam directed towards the local surface normal of the reference surface 111 is unobscured for a desired FOV over the test surface 120. Such a configuration maximizes a signal-to-noise ratio of an image signal formed by an image beam at a detector (not pictured). In addition, the normal incidence can prevent vignetting of the reflected beam off the reference or test surface. Further, in certain embodiments, it can be advantageous for the numerical aperture (NA) of the objective element 113 to take a small value, e.g., less than 0.5, less than 0.4, less than 0.3, or less than 0.2. There are two reasons for this: First, in order to attain a large FOV of an objective, a corresponding decrease in its imaging NA (within normal size and cost constraints) is required. Second, it ensures that, for sufficiently small values of the NA, individual reference beams will be substantially reflected back upon themselves, ensuring that all unobscured illumination beams result in substantially unobscured image beams. (Rough test surfaces, on the other hand, may induce some obscurations of chief rays via diffuse scatter and subsequent loss of intensity for the test beam.)

The exemplary embodiment described above and in FIG. 1 has a number of advantages over the state of the art. For example, FIG. 2a illustrates a Mirau interferometric objective. Mirau objectives rely on an objective element with a large NA to produce a beam diameter larger than a reference mirror diameter placed directly in its path. As stated above, increasing the FOV of an objective normally requires a corresponding decrease in its imaging NA to maintain reasonable objective dimensions and to achieve acceptable imaging quality. A Mirau objective with a large FOV requires a large reference mirror, thereby creating a large obscuration of the illumination and imaging NA. These vignetting problems become more serious as the FOV increases and the imaging NA decreases to a point where no light is returned through the objective to the test surface. The Mirau is thus precluded from being used in applications where large FOV and low NA is required.

Further, in the exemplary embodiment in FIG. 1, the reference surface may be curved in a spherical or aspherical profile and is used to deduce the profile of nominally conical annular test surfaces whose local surface normals possess an angle with respect to the optical axis of the interferometric objective that is large, e.g., greater than 10 degrees, greater than 20 degrees, greater than 30 degrees, greater than 40 degrees, greater than 50 degrees. On the other hand, the reference surface for a Mirau objective is planar and is used to deduce surface profiles of nominally flat test surfaces whose normal is, on average, substantially parallel to the optical axis of the interferometric objective.

Figure 2B:
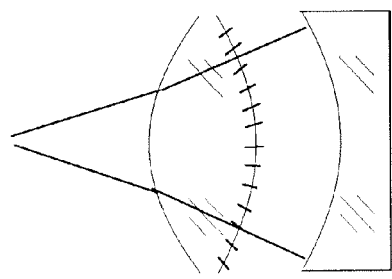
FIG. 2b is an illustration of a Fizeau interferometric objective.

FIG. 2b illustrates a Fizeau interferometric objective, where, the beamsplitter surface is the reference surface. Therefore there are inherent optical path length differences in the reference and test beams. Due to these differences between the test and reference beams, the Fizeau interferometric objective is limited to coherent illumination and is therefore not preferable for the measurement of rough test surfaces.

Figure 2D:
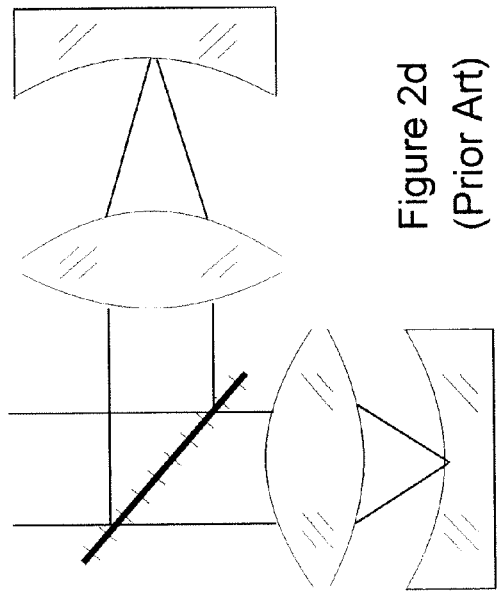
FIG. 2d is an illustration of a Linnik interferometric objective.
Figure 2A:
FIG. 2a is an illustration of a Mirau interferometric objective.
Figure 2C:
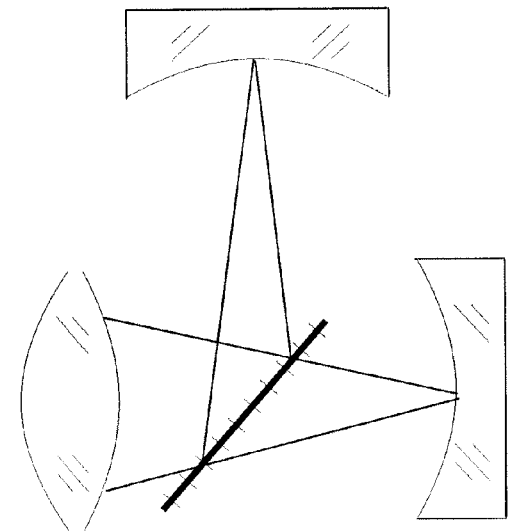
FIG. 2c is an illustration of a Michelson interferometric objective.

FIG. 2c illustrates a typical Michelson interferometric objective. In such an objective, the objective beamsplitter is placed between an objective element and a test surface, usually at an angle of 45° with respect to the optical axis. The reference path therefore juts out on one side of the objective.

This disqualifies the Michelson interferometric objective for applications with very limited space conditions (as it is the case, for instance, inside a narrow bore).

FIG. 2d illustrates a classic Linnik interferometric objective. In such an objective, the objective beamsplitter is placed between two matched objective elements. One objective, the reference leg objective, is at usually at an angle of 90° with respect to the other objective, the test leg objective. The reference leg containing the objective and reference plate therefore juts out on one side of the inline, test leg objective. This disqualifies the classic Linnik interferometric objective for applications with very limited space. Further, matching the test and reference leg objectives for optical path length and dispersion can be challenging.

Figure 3:
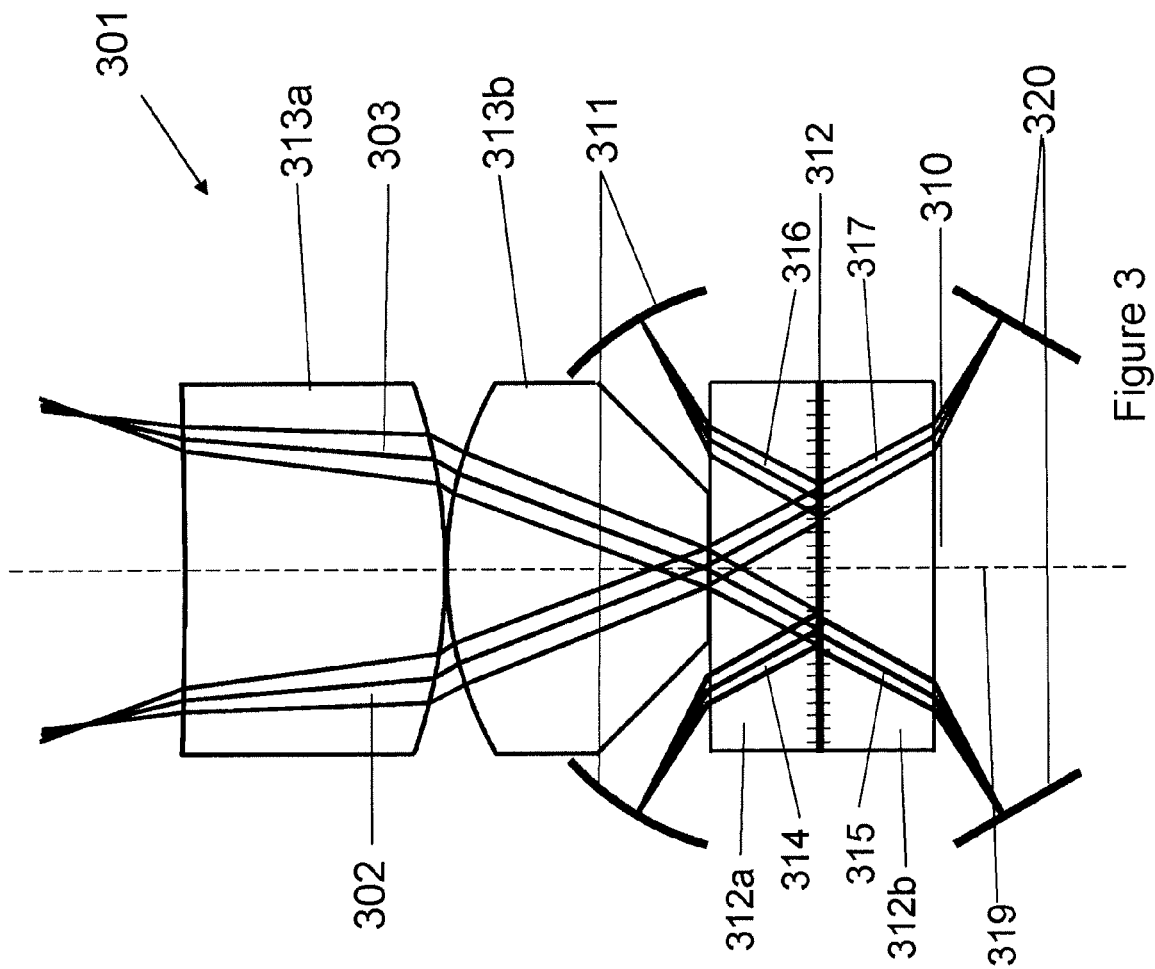
FIG. 3 illustrates a first embodiment, where the objective beamsplitter comprises two glass plates of finite thickness and the reference surface is a mirror.

A first embodiment shown in FIG. 3 corresponds to the exemplary embodiment illustrated in FIG. 1, where the objective beamsplitter 112 comprises two glass plates 312a, 312b of finite thickness, one of which has a partially reflective coating on the surface directed to the other plate. In order to attain symmetry in the test and reference beam paths, the two glass plates have substantially the same thicknesses. The two additional lenses 313a, 313b shown are part of the illumination and imaging system. These lenses are placed in the window of the reference surface, and are designed so that each illumination beam, when split into reference beams 314, 316 and test beams 315, 317, produces a chief ray in the reference beams 314, 316 normal locally normal to the reference surface 311. Note that either parallel plate 312a, 312b comprising the objective beamsplitter 312 within the interferometric cavity 310 can be shifted along the optical axis 319, thereby breaking the geometrical symmetry with respect to the objective beamsplitter 312; such a break in the geometrical symmetry, however, has no effect on the optical path length or dispersion symmetry between the test and reference beams. The reference surface 311 is a mirror and is attached to the interferometric objective via either the objective element or one or both of the beamsplitter plates 312a,b.

Note that the condition that each illumination beam 302, 303 have its corresponding image beam follow the same optical path enables the same optics to serve as the illumination optics and imaging optics 313a,b. Because of this reuse of the optics 313a,b, the interferometric objective 301 design is able to take a compact form.

Figure 4:
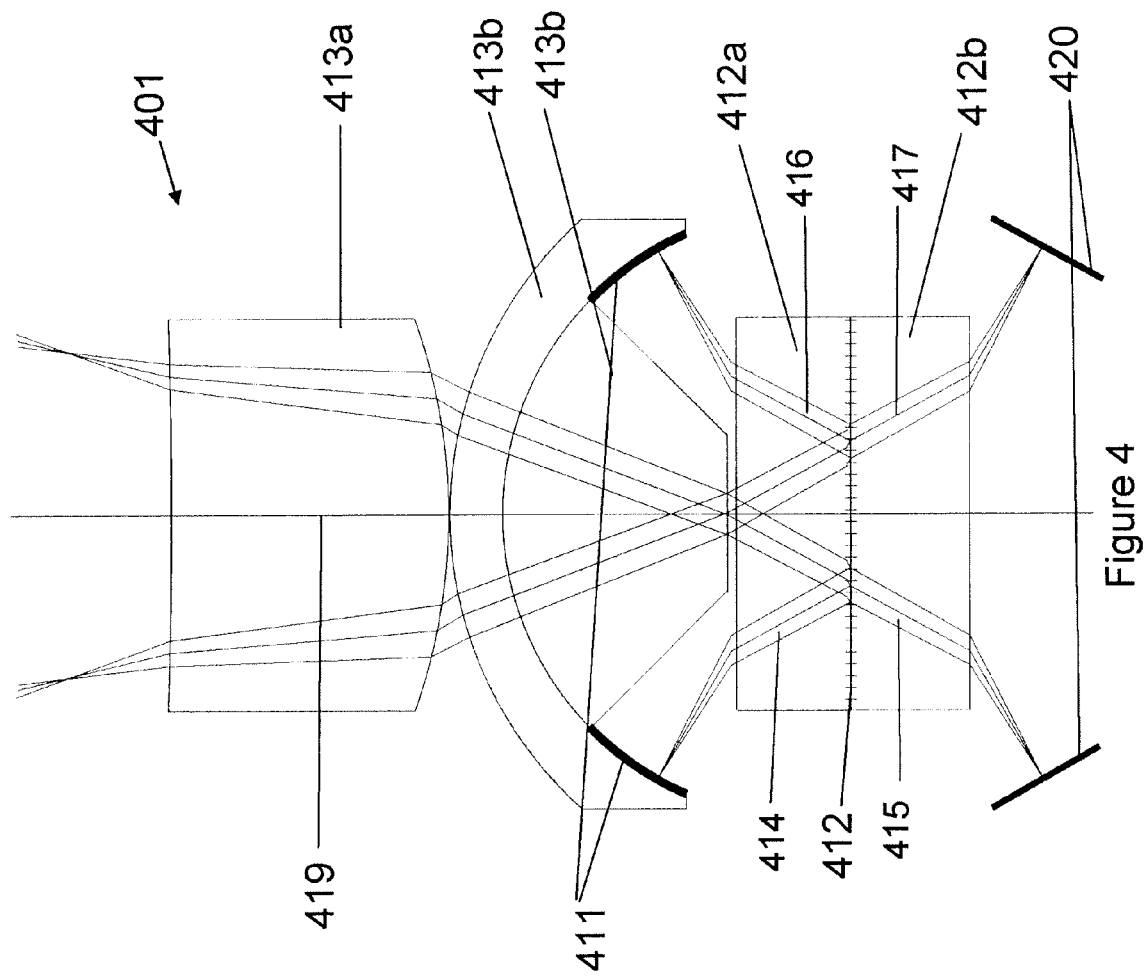
FIG. 4 illustrates a variation of the first embodiment, where the reference surface is on an overhang of a doublet.

A variation of the first embodiment is illustrated in FIG. 4. The difference is in that one of the lenses 413b in the paths of the image and illumination beams has been split into a doublet with one part clearly larger in diameter. The overhanging extended contact surface of the doublet 413b acts as the reference surface 411 in this system. The reference surface 411 may be defined by an overhang area of the doublet. It is advantageous for the reference surface to have a reflective coating, although such a coating is not a requirement. Such a configuration may be advantageous due to ease of manufacturability of the reference surface 411 and alignment of the reference surface 411 with respect to the optical axis 419.

Figure 5:
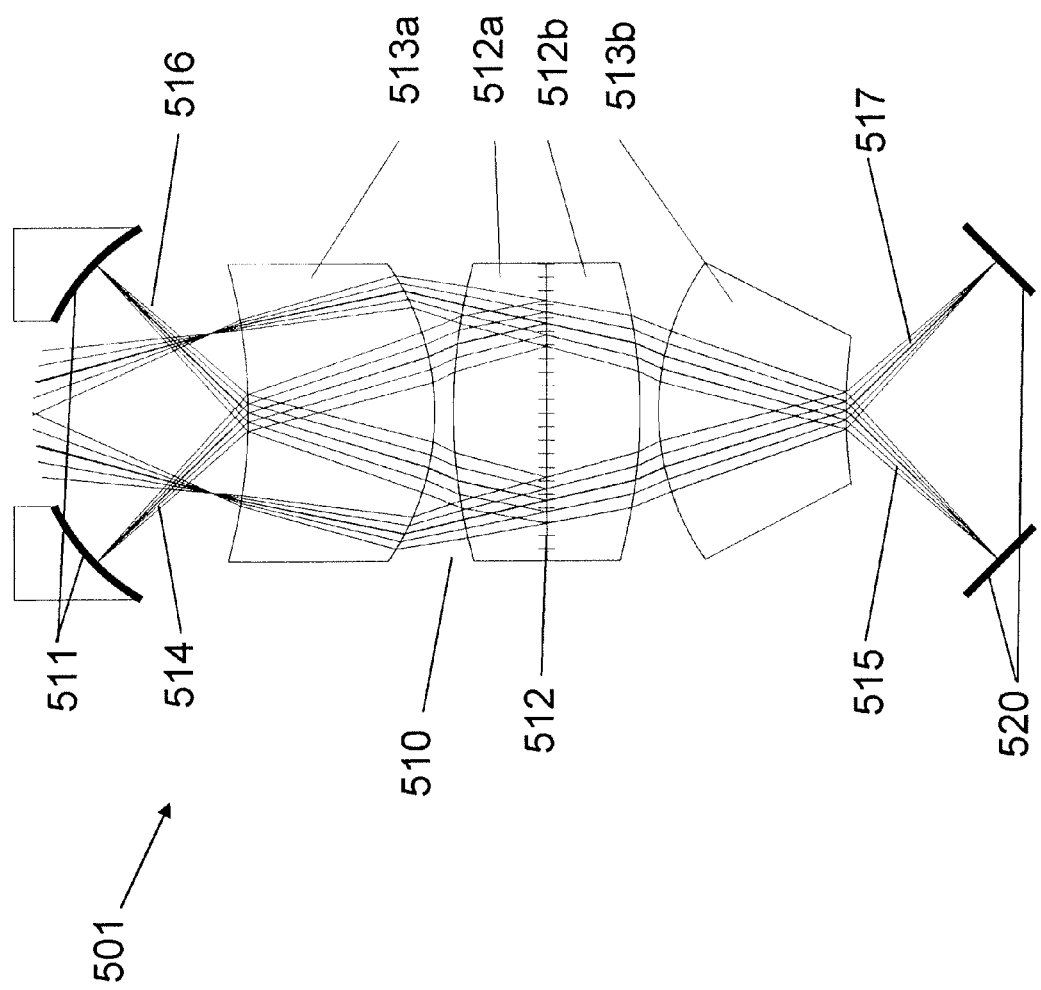
FIG. 5 illustrates a second embodiment, where the interferometric cavity contains more glass than just two plane parallel plates.

A second embodiment is shown in FIG. 5; here, the interferometric cavity 510 contains more glass than just two plane parallel plates. This design is advantageous if space is limited at the very tip of the objective, that is, there is no room for a reference surface 511 that must be at least as big as the inspected area of the test surface 520. Note that the elements 512a,b that comprise the beamsplitter 512 also have optical power; in FIG. 5, the power of the elements 512a,b is positive. Also note that the elements 512a,b and 513a,b are essentially symmetric with respect to the beamsplitter 512 in that the elements 512a,b and 513a,b have their respective radii of curvatures and thicknesses substantially the same, although their respective diametrical profiles are adapted to the tapered geometry of the overall object. The symmetric nature of the optical elements in the interferometric cavity might not be ideal in terms of overall imaging properties; in that case, potential aberrations must be corrected by subsequent optical elements following the lenses 512a,b, 513a,b in the interferometric cavity 510.

Figure 6:
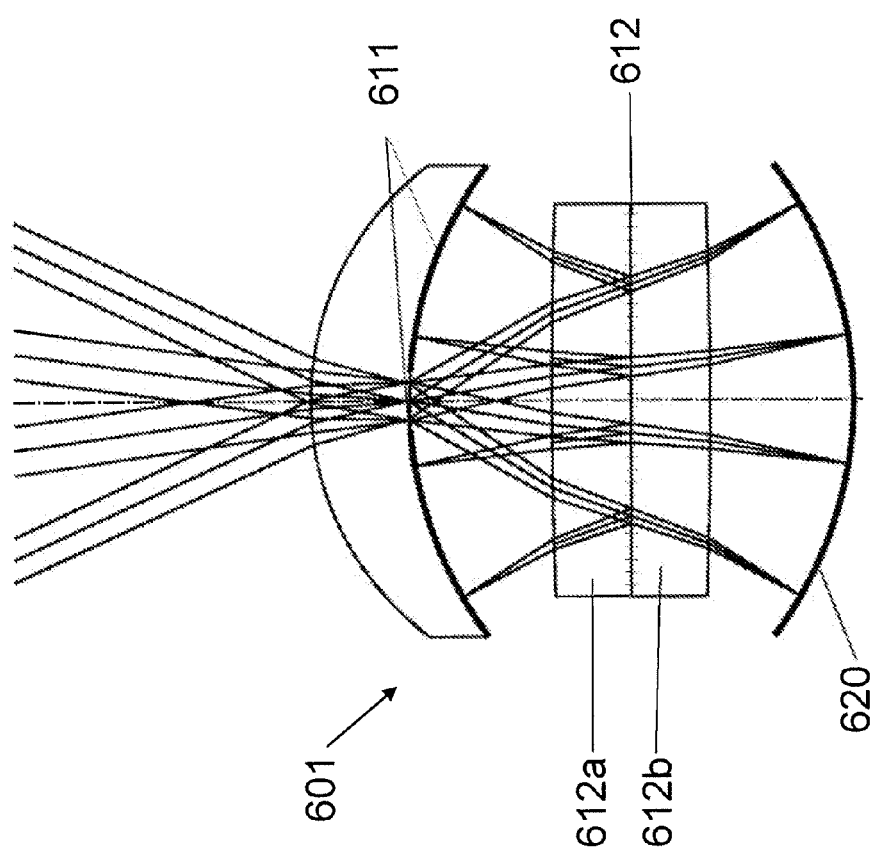
FIG. 6 illustrates a third embodiment, where the reference surface is the last surface of the optical element prior to the objective beamsplitter.

A third embodiment is shown in FIG. 6; this embodiment differs from the previous ones in that the reference surface 611 is the last surface of the optical element 613 prior to the objective beamsplitter 612. The concave last surface is coated with a reflective coating with the exception that the central area of the last surface is not coated with the reflective coating and acts as a transparent window to the rest of the interferometric objective 601.

Figure 7:
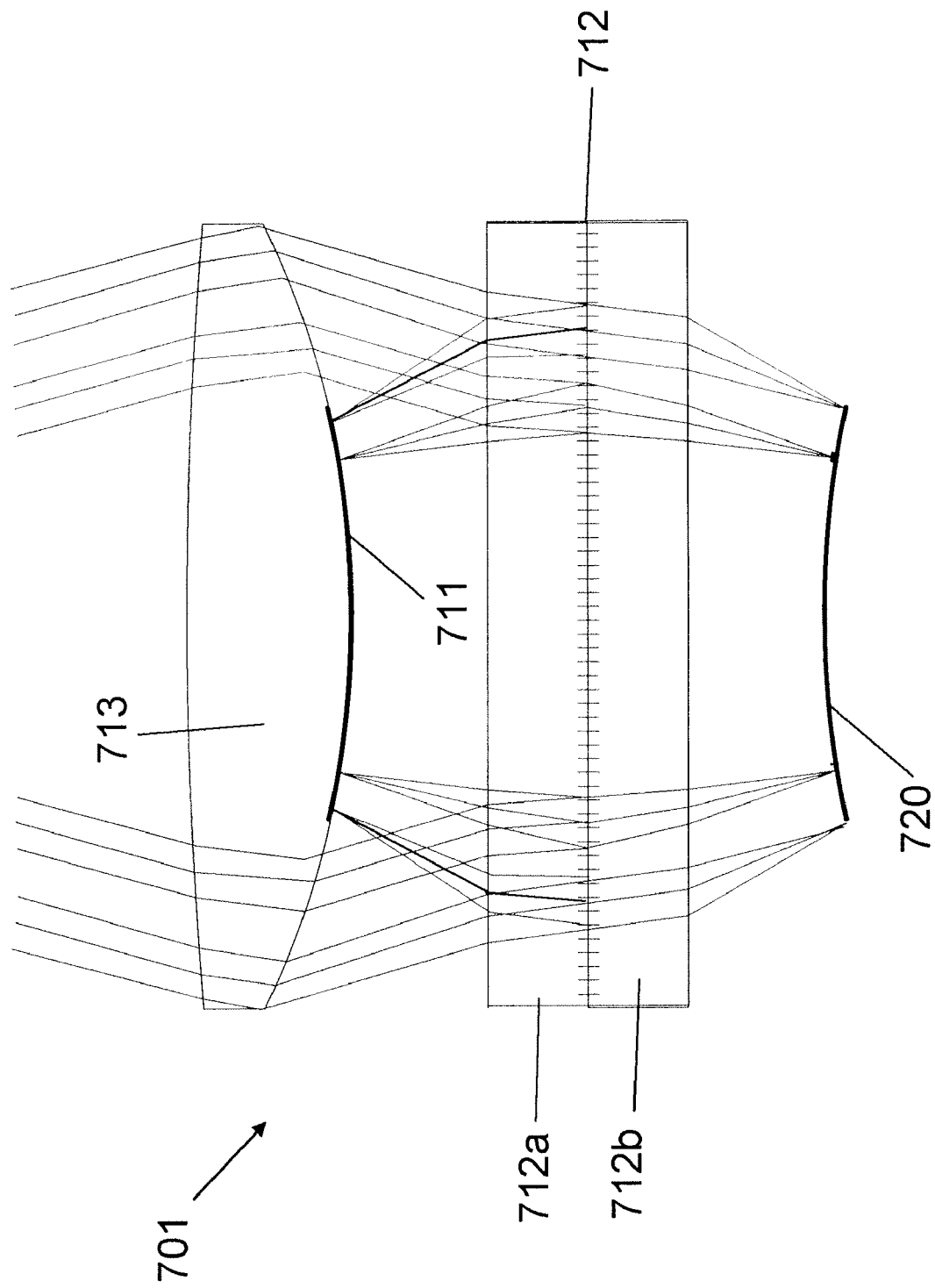
FIG. 7 illustrates a fourth embodiment, where the reference surface is convex and coated with a reflective coating over the central area of the lens.

A fourth embodiment shown in FIG. 7 differs from the third embodiment in that the reference surface 711 on the last surface of the optical element 713 prior to the objective beamsplitter 712 is convex, rather than concave, and coated with a reflective coating over the central area of the lens; the outer part of the reference surface is not coated with a reflective coating and acts as an off-axis window to the rest of the interferometric objective 701. This configuration allows the measurement of convex test surfaces and produces annular test wavefronts.

Figure 8B:
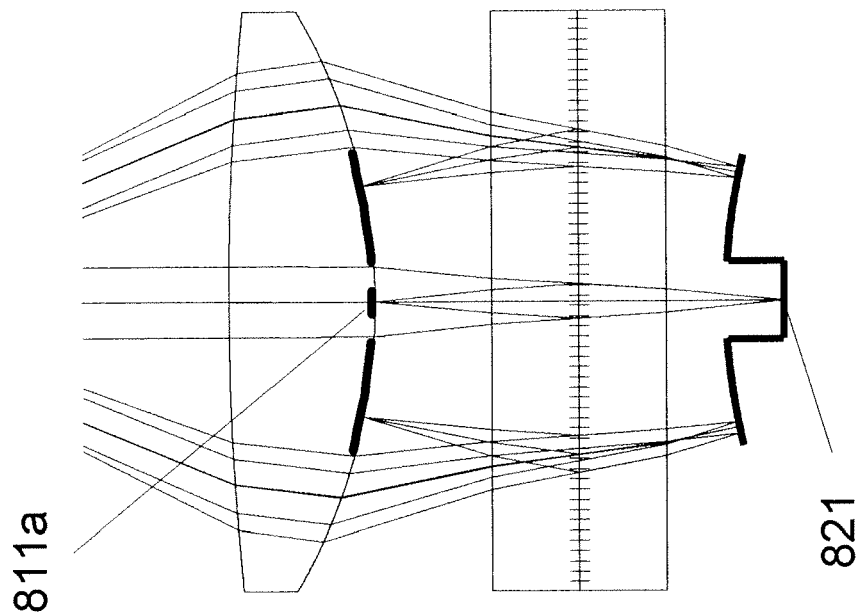
FIG. 8a and FIG. 8b illustrate a fifth embodiment, where there is a central obscuration on the last surface that is smaller than the illumination beam diameter at that last surface.
Figure 8A:
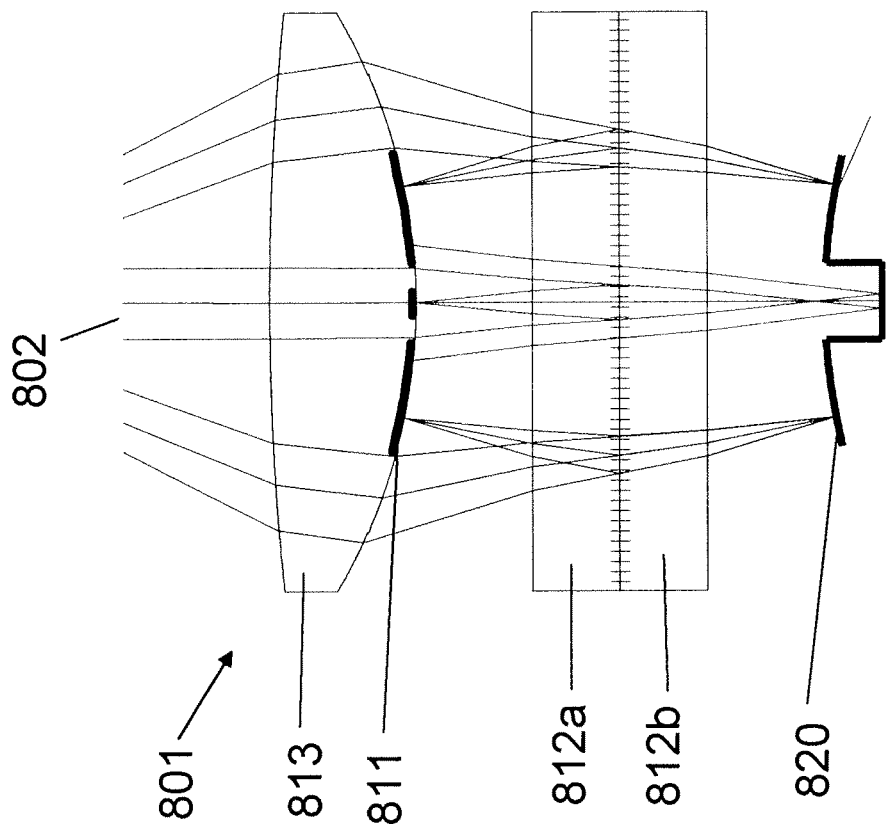

Nevertheless, such a configuration poses a difficulty in obtaining high contrast fringes for on-axis measurements. A fifth embodiment shown in FIGS. 8a and 8b resolves this difficulty. This fifth embodiment differs from the fourth embodiment in that there is a central obscuration 811a on the last surface that is smaller than the illumination beam diameter at that last surface. On the side facing the objective beamsplitter 812, the obscuration 811a acts as a reflective reference area with the central obscuration lying on a curved surface. In contrast, to the fourth embodiment, this embodiment allows for on-axis measurements not disturbed by unwanted reflections or transmissions that reduce fringe contrast. Note that adding a small reflective central obscuration on the last surface in the third embodiment would also allow for on-axis measurements with high fringe contrast. FIGS. 8a and 8b shows a case where the on-axis measurement capability is used to relate the curved test surface 820 to an axial datum 821. FIG. 8a shows the interferometric objective 801 adjusted to measure the curved test surface 820. In FIG. 8b, the interferometric objective 801 is closer to the part and now adjusted to measure the axial datum 821.

Figure 9:
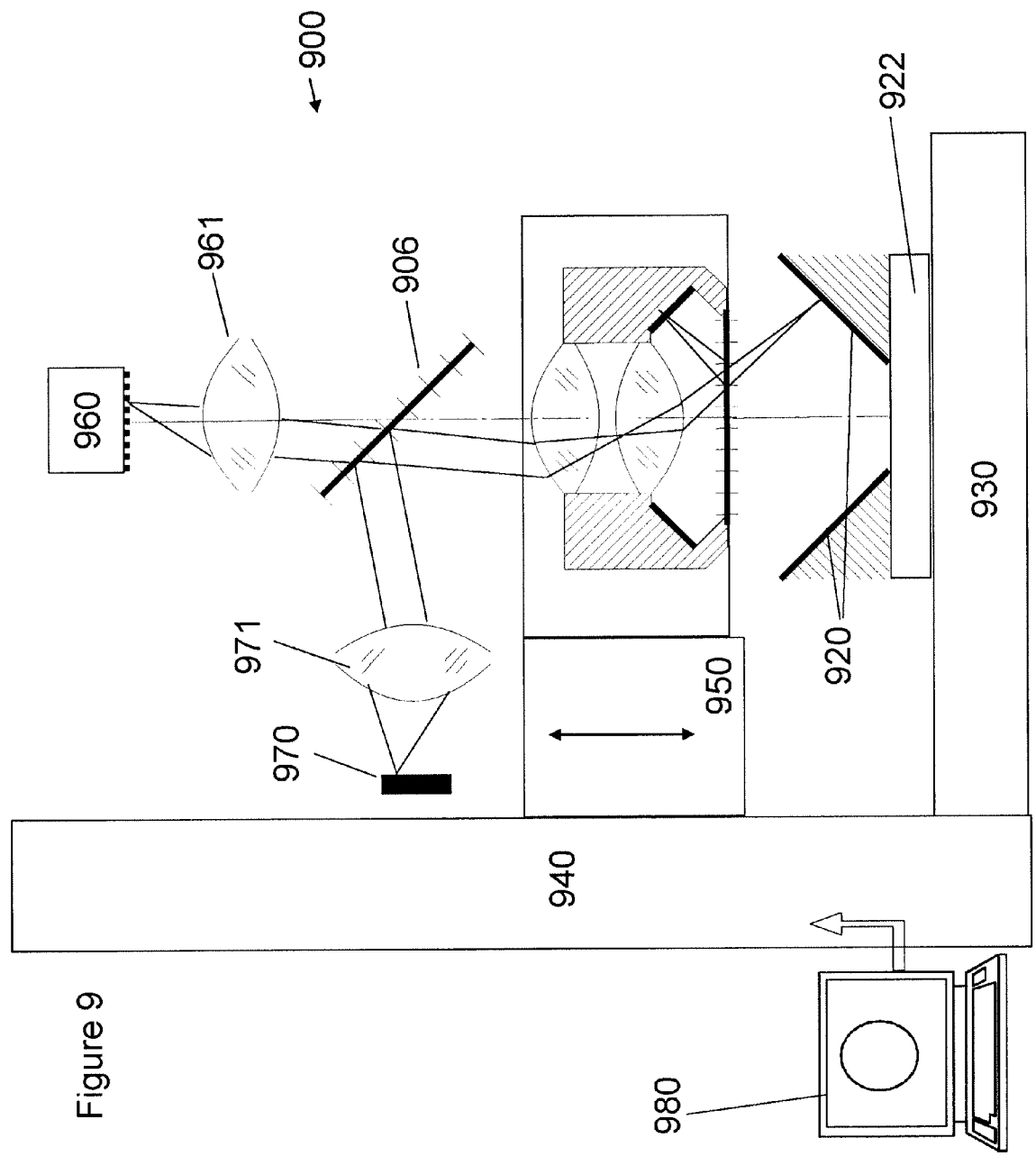
FIG. 9 illustrates a possible system configuration for positioning the interferometric objective.

Various system configurations are possible for positioning the interferometric objective. In FIG. 9, for example, interferometry system 900 includes interferometric objective 901 mounted to a z stage 950 (i.e., a vertical translation stage) on a pillar 940 affixed to a base 930. Computer 980 controls the z stage 950, which is to be used in scanning for optical path difference (OPD) between the reference and test beams in the interferometric objective. The imaging beams are sent to camera 960 for viewing and processing of interference images.

Figure 10:
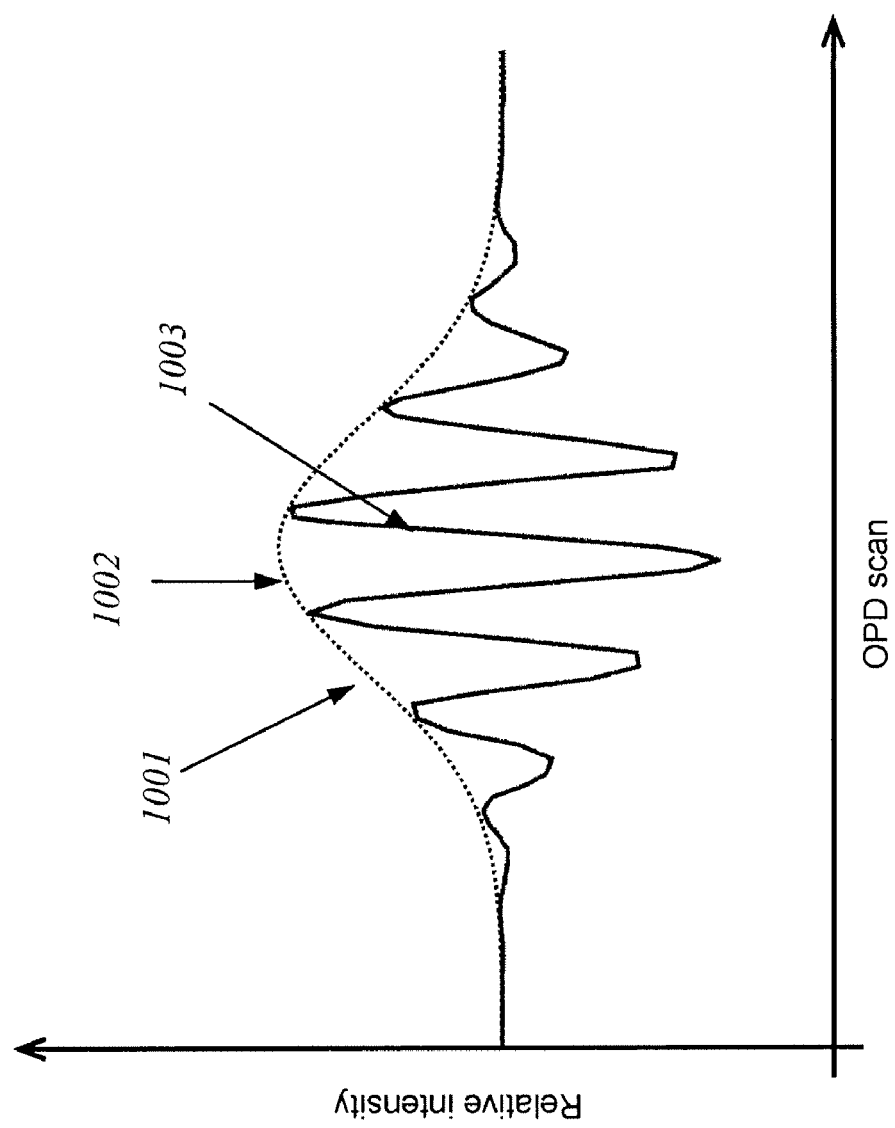
FIG. 10 is a plot of relative intensity of a pixel as a function of optical path difference (OPD)

In the low coherence interferometry approach, the measurement process is similar to that used with a scanning white light interferometer (SWLI). An example data set acquired for a single camera pixel using a SWLI process is shown in FIG. 10. The localization of an interference intensity signal 1003 around the zero OPD position is characteristic of interferometry assuming that source 930 in FIG. 9 is spectrally broadband, e.g., has a spectral bandwidth of 100 nm centered at 600 nm. Note that the width of the localization is proportional to the coherence length of the illumination. The fringe localization provides a means for determining the precise position where the test beam and reference beam have matched optical paths. The scan motion is precisely controlled, so that knowledge of when a given object point is at zero OPD can be directly translated into a test surface height H as a function of chief ray angle $\theta$ and azimuthal angle $\phi$. That is, given a reference surface profile and an angle of incidence ($\theta$, $\phi$) of the illumination beam—which corresponds to a unique point in an extended source—upon the beamsplitter 906 in FIG. 9, a zero OPD between the test and reference beam would then imply that the height of the test surface H ($\theta$, $\phi$) is equal to the known height of the reference surface. One can apply any of a variety of techniques for determining subsequent test surface heights using low-coherence sources. Suppose for example interference data for a first pixel looks as in FIG. 10, with a peak 1002 in the fringe contrast 1001 at a scan position of 0 µm. A second pixel might have a different fringe contrast peak at a different scan position, for example 10 µm. The difference in height H between the two object points corresponding to these image pixels would therefore be 10 µm. The data processing can include techniques disclosed in for, example, Zygo U.S. Pat. Nos. 5,398,113, 7,030,996, and 7,212,291, the contents of which are incorporated herein by reference.

Figure 11:
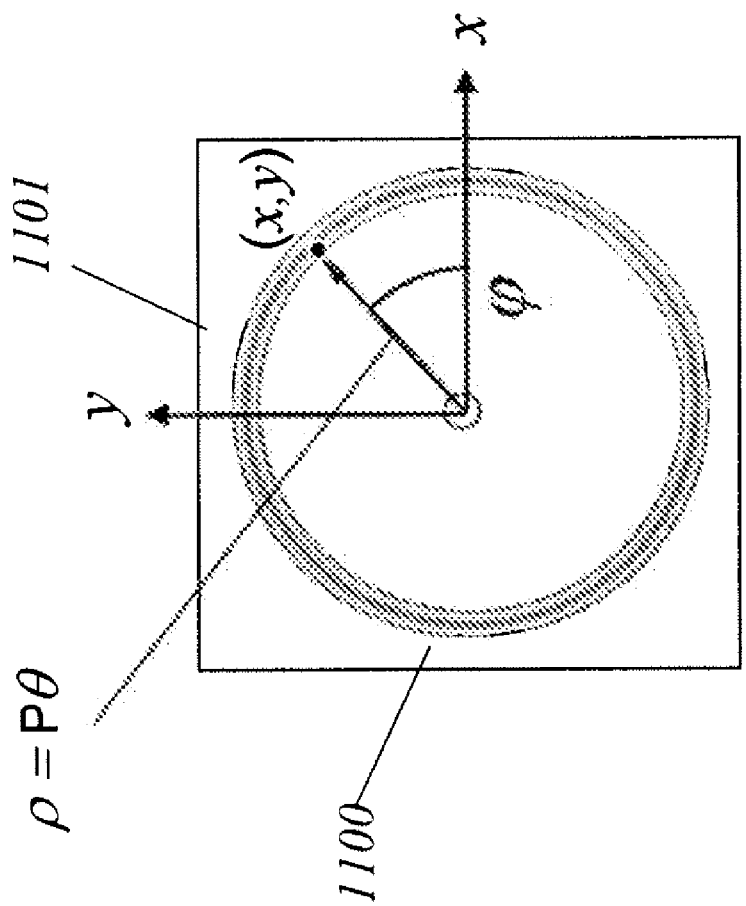
FIG. 11 shows the coordinate mapping to camera image.

The determination of the angle of incidence ($\theta$, $\phi$) of the illumination beam is performed by a transformation of the unit sphere onto a flat plane. FIG. 11 shows such a map onto a flat-field image 1100 on a camera area 1101. The mapping typically involves a coordinate transformation that may for example be $$\rho = P\theta \tag{1}$$

where $\rho$ is the radius on the camera image with respect to the optical axis at the image and P is a known scaling factor that depends on the details of the objective element and the illumination and imaging optics. The direct result from a measurement, then, is therefore a collection of measured surface heights H as a function of the chief ray angle $\theta$ and azimuthal angles $\phi$. Many other mappings are possible, depending on the optical properties of the interferometric system.

Figure 12:
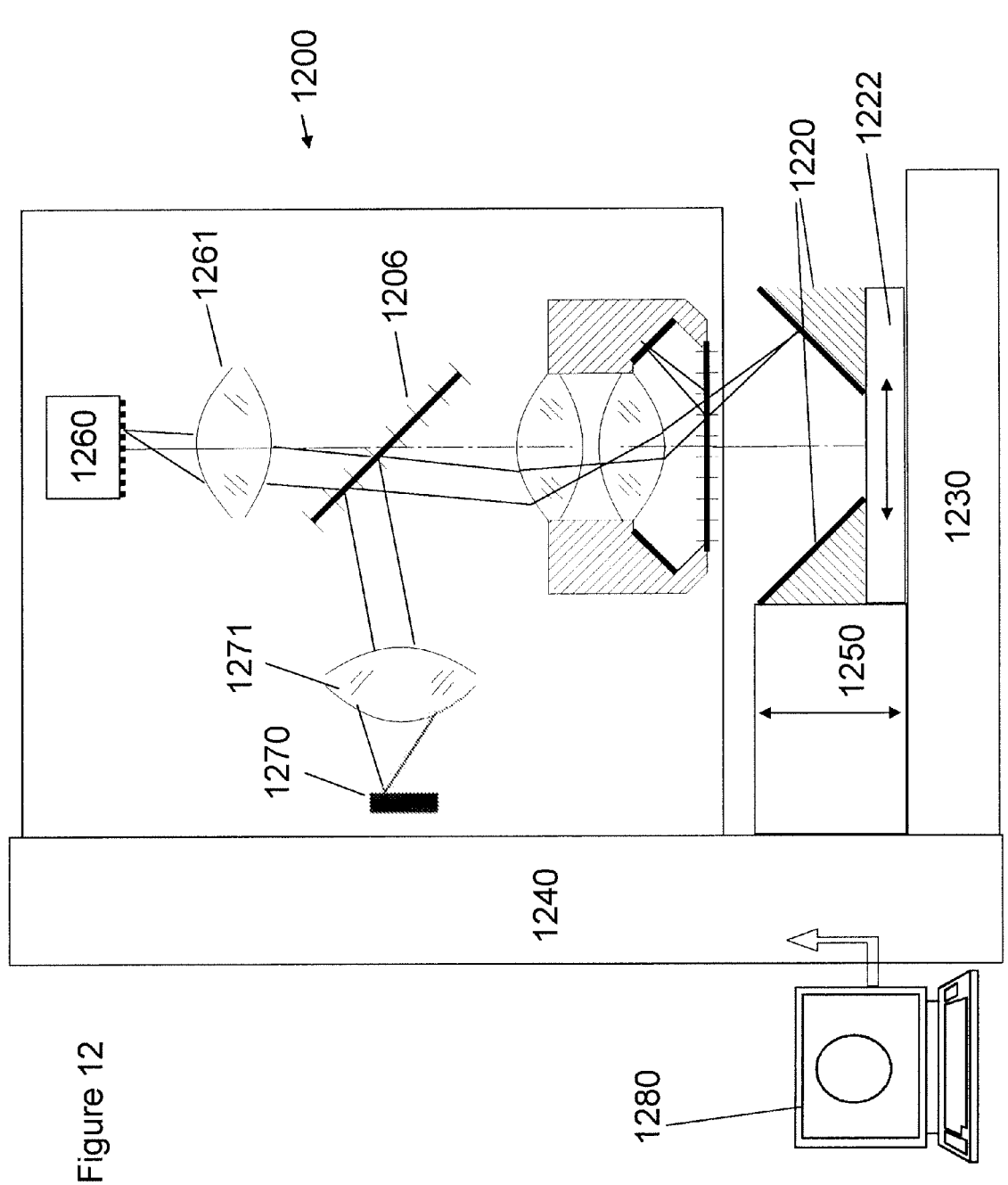
FIG. 12 illustrates an alternative system configuration for positioning the interferometric objective.

An alternative configuration of the interferometry system is illustrated in FIG. 12. In this configuration, the test surface is attached to both a z stage 1250 and an xy stage 1222, while the sensor 1200 is fixed. Such a configuration may be advantageous in the case of a less constrained measurement environment, where additional alignment of the test surface with respect to the interferometric objective may be required.

The embodiments above were described in detail; other embodiments are possible. For example, the objective elements may be part of a catoptric or catadioptric lens system, and may comprise diffractive and holographic optical elements. The former would be advantageous for color-correction, the latter for dispersive systems.

The exemplary embodiment described above required a matching of the optical path lengths between the chief ray of a reference beam and a test beam. Nevertheless, one could also introduce fixed OPD offset with the reference surface out of focus and use wavelength tuning or spectral decomposition to evaluate the resulting fringe images.

In any of the embodiments described above, a computer containing the central processing unit can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments have been described. Nevertheless, it will be understood that various modifications may be made without departing from the spirit and scope of the invention. Accordingly, other embodiments are within the scope of the following claims.

What is claimed is:

1. An apparatus comprising:
   an interferometric objective comprising a beam splitter surface configured to separate input light into test light and reference light, and a reference surface configured to receive the reference light and direct it back to the beam splitter surface, which is configured to recombine the reference light with test light reflected from a test surface,
   the interferometric objective further comprising one or more optical elements positioned in the path of the input light and having positive or negative optical power,
   wherein the reference surface is curved and defines a window configured to pass the input light towards the beam splitter surface.

2. The apparatus of claim 1, wherein the window is inside the reference surface.

3. The apparatus of claim 2, wherein the reference surface extends around portions of the window.

4. The apparatus of claim 3, wherein the reference surface completely surrounds the periphery of the window.

5. The apparatus of claim 2, wherein one of the optical elements having optical power is positioned in the window.

6. The apparatus of claim 1, wherein the window is an outer annulus surrounding at least a portion of the reference surface.

7. The apparatus of claim 6, wherein reference surface further defines a second inner window through which a portion of the input light is configured to pass to the beam splitter surface.

8. The apparatus of claim 6, wherein the reference surface is convex with respect to reflecting the reference light.

9. The apparatus of claim 1, wherein the reference surface defines an annular optical measurement surface for an annular test surface wherein the optical measurement surface is a surface in the path of the test light corresponding to a zero optical path length difference between the test light and reference light.

10. The apparatus of claim 1, wherein the curvature of the reference surface is conical, spherical, or aspheric.

11. The apparatus of claim 1, wherein the beam-splitting surface, the reference surface, and the one or more optical elements with positive or negative optical power extend along an optical axis and are each rotationally symmetric with respect to the optical axis.

12. The apparatus of claim 11, wherein the reference surface is annular.

13. The apparatus of claim 12, wherein the window comprises an inner window inside the annular reference surface.

14. The apparatus of claim 12, wherein the window comprises an outer annular window outside the annular reference surface.

15. The apparatus of claim 1, wherein the one or more optical elements with optical power cause chief rays for the reference light to be substantially normal to the reference surface.

16. The apparatus of claim 1, wherein the one or more optical elements with optical power comprises multiple lens elements.

17. The apparatus of claim 1, wherein the reference surface is a reflective coating on one of the optical elements with optical power.

18. The apparatus of claim 1, wherein the beam-splitter surface is formed by an interface between two optical element, at least one of which is one of the optical elements having optical power.

19. The apparatus of claim 1, wherein the one or more elements with optical power cause the reference light to converge toward the reference surface and wherein the reference surface has a concave curvature with respect to incident reference light.

20. The apparatus of claim 1, wherein during operation the reference light passes through at least one of the one or more elements with optical power after being formed by the beam-splitting surface and before contacting the reference surface.

21. The apparatus of claim 1, wherein the reference surface defines an outer annular window and an inner window with a central obscuration to provide on-axis reference light.

22. The apparatus of claim 1, wherein the interference objective is a unitary component configured to fit into a microscope.

23. The apparatus of claim 22, further comprising the microscope.

24. The apparatus of claim 23, further comprising a displacement element configured to scan a distance between the interference objective and the test surface, and a detector configured to record an interference patterned formed by the recombined test and reference light for each of multiple scan positions for the distance between the interference objective and the test surface.

25. A method comprising performing scanning interferometry measurements of an annular test surface utilizing the interference objective of claim 1.

26. The method of claim 25, wherein the annular test surface is a conical valve seat.

27. The method of claim 25, wherein the annular test surface is located in a bore of cylindrical test object.

28. An apparatus comprising:
   an interferometric objective comprising a beam splitter surface configured to separate input light into test light and reference light, and a reference surface configured to receive the reference light and direct it back to the beam splitter surface, which is configured to recombine the reference light with test light reflected from a test surface,
   the interferometric objective further comprising one or more optical elements positioned in the path of the input light and having positive or negative optical power,
   wherein the reference surface defines a window inside the reference surface and configured to pass the input light towards the beam splitter surface.

* * * * *